(12) United States Patent
Stancu et al.

(10) Patent No.: US 8,749,090 B2
(45) Date of Patent: Jun. 10, 2014

(54) DUAL SOURCE AUTOMOTIVE PROPULSION SYSTEM AND METHOD OF OPERATION

(75) Inventors: Constantin C. Stancu, Anaheim, CA (US); Robert T. Dawsey, Torrance, CA (US)

(73) Assignee: GM Global Technology Operations LLC, Detroit, MI (US)

(*) Notice: Subject to any disclaimer, the term of this patent is extended or adjusted under 35 U.S.C. 154(b) by 717 days.

(21) Appl. No.: 12/699,535

(22) Filed: Feb. 3, 2010

(65) Prior Publication Data

US 2011/0187301 A1    Aug. 4, 2011

(51) Int. Cl.
*H02G 3/00*    (2006.01)

(52) U.S. Cl.
USPC ...... 307/9.1; 307/10.1; 318/139; 318/400.13; 318/400.21

(58) Field of Classification Search
USPC ............. 307/9.1, 10.1; 318/139, 400.13, 801, 318/400.21; 363/132
See application file for complete search history.

(56) References Cited

U.S. PATENT DOCUMENTS

| | | | |
|---|---|---|---|
| 6,066,928 A * | 5/2000 | Kinoshita et al. | 318/139 |
| 6,212,085 B1 * | 4/2001 | West | 363/132 |
| 6,320,775 B1 * | 11/2001 | Ito et al. | 363/132 |
| 6,548,984 B2 * | 4/2003 | Shamoto et al. | 318/801 |
| 2003/0057908 A1 * | 3/2003 | Kusaka et al. | 318/442 |
| 2003/0057914 A1 * | 3/2003 | Kamatsu et al. | 318/727 |
| 2005/0258796 A1 * | 11/2005 | Kusaka | 318/801 |
| 2008/0024078 A1 * | 1/2008 | Oyobe et al. | 318/262 |
| 2008/0278102 A1 * | 11/2008 | Taniguchi | 318/400.27 |
| 2009/0134700 A1 * | 5/2009 | Tanaka et al. | 307/10.6 |

OTHER PUBLICATIONS

German Patent Office, German Office Action dated Jun. 13, 2012 for German Patent Application 10 2011 003 372.6.

\* cited by examiner

*Primary Examiner* — Jared Fureman
*Assistant Examiner* — Alfonso Perez Borroto
(74) *Attorney, Agent, or Firm* — Ingrassia Fisher & Lorenz, P.C.

(57) ABSTRACT

Automotive propulsion systems and methods of operation are provided. The automotive propulsion system includes a first voltage source, a power electronics device comprising a plurality of power switching devices coupled to the first voltage source, an electric motor having a plurality of windings coupled to the plurality of power switching devices and a neutral node interconnecting the plurality of windings, and a second voltage source coupled to the neutral node of the electric motor and the first voltage source.

17 Claims, 4 Drawing Sheets

DUAL SOURCE AUTOMOTIVE PROPULSION SYSTEM AND METHOD OF OPERATION

TECHNICAL FIELD

The present invention generally relates to automotive propulsion systems. More specifically, the present invention relates to a dual source automotive propulsion system and method of operation.

BACKGROUND OF THE INVENTION

In recent years, advances in technology, as well as ever-evolving tastes in style, have led to substantial changes in the design of automobiles. One of the changes involves the complexity of the electrical systems within automobiles, particularly alternative fuel (or propulsion) vehicles that utilize voltage supplies, such as hybrid and battery electric vehicles. Such alternative fuel vehicles typically use one or more electric motors, often powered by batteries, perhaps in combination with another actuator, to drive the wheels.

Such vehicles (e.g., fuel cell vehicles) often use two separate voltage sources, such as a battery and a fuel cell, to power the electric motors that drive the wheels. Power electronics (or power electronics devices or systems), such as direct current-to-direct current (DC/DC) converters, are typically used to manage and transfer the power from the two voltage sources. Also, due to the fact that alternative fuel automobiles typically include only direct current (DC) power supplies, direct current-to-alternating current (DC/AC) inverters (or power inverters) are also provided to convert the DC power to alternating current (AC) power, which is generally required by the motors.

As such, alternative fuel vehicles often include two (or more) power electronics devices to manage power between two voltage sources and provide power from the voltage source to one or more electric motor. As the power demands on the electrical systems in alternative fuel vehicles continue to increase, there is an ever-increasing need to maximize the electrical efficiency and performance of such systems. There is also a constant desire to reduce the size of the components within the electrical systems in order to minimize the overall cost and weight of the vehicles.

Accordingly, it is desirable to provide an improved automotive propulsion system with two voltage sources and method for operating such a system. Furthermore, other desirable features and characteristics of the present invention will become apparent from the subsequent detailed description and the appended claims, taken in conjunction with the accompanying drawings and the foregoing technical field and background.

SUMMARY OF THE INVENTION

An automotive propulsion system is provided. The automotive propulsion system includes a first voltage source, a power electronics device comprising a plurality of power switching devices coupled to the first voltage source, an electric motor having a plurality of windings and a neutral node, the plurality of windings being coupled to the plurality of power switching devices and the neutral node interconnecting the plurality of windings, and a second voltage source coupled to the neutral node of the electric motor and the first voltage source.

An automotive propulsion system is provided. The automotive propulsion system includes a first voltage source, a power inverter comprising a plurality of power switching devices coupled to the first voltage source, an electric motor having a plurality of windings and a neutral node, the plurality of windings being coupled to the plurality of power switching devices and the neutral node interconnecting the plurality of windings, a second voltage source coupled to the neutral node of the electric motor and the first voltage source, and a processing system in operable communication with the first and second voltage sources, the plurality of switching devices, and the electric motor. The processing system is configured to determine a desired power flow for the second voltage source, calculate a direct current (DC) component based on the desired power flow, and operate the plurality of switches such that an alternating current (AC) waveform with the calculated direct current (DC) component is generated.

A method for operating automotive power electronics is provided. The power electronics includes a plurality of power switching devices couple to an electric motor having a plurality of windings interconnected by a neutral node, a first voltage source, and a second voltage source coupled to the neutral node. A desired power flow for the second voltage source is determined. A DC component is calculated based on the desired power flow. The plurality of switching devices are operated such that an AC waveform with the calculated DC component is generated causing the desired power flow for the second voltage source.

DESCRIPTION OF THE DRAWINGS

The present invention will hereinafter be described in conjunction with the following drawing figures, wherein like numerals denote like elements.

DESCRIPTION OF AN EXEMPLARY EMBODIMENT

The following detailed description is merely exemplary in nature and is not intended to limit the invention or the application and uses of the invention. Furthermore, there is no intention to be bound by any expressed or implied theory presented in the preceding technical field, background, brief summary or the following detailed description. Additionally, although the schematic diagrams shown herein depict example arrangements of elements, additional intervening elements, devices, features, or components may be present in an actual embodiment. It should also be understood that FIGS. 1-6 are merely illustrative and may not be drawn to scale.

FIG. 1 to FIG. 6 illustrate an automotive propulsion system and method for operating such a system. The automotive propulsion system includes a first voltage source (e.g., a fuel cell), power electronics (e.g., a power inverter) including a plurality of power switching devices coupled to the first voltage source, an electric motor having a plurality of windings interconnected by a neutral node and coupled to the plurality of power switching devices, and a second voltage source (e.g., a battery) coupled to the neutral node of the electric motor and the first voltage source. A processing system may also be included, which is in operable communication with the first and second voltage sources, the plurality of switching devices, and the electric motor. The processing system may be configured to determine a desired power flow for the second voltage source, calculate a direct current (DC) component based on the desired power flow, and operate the plurality of switches such that an alternating current (AC) waveform with the calculated DC component is generated.

Figure 1:
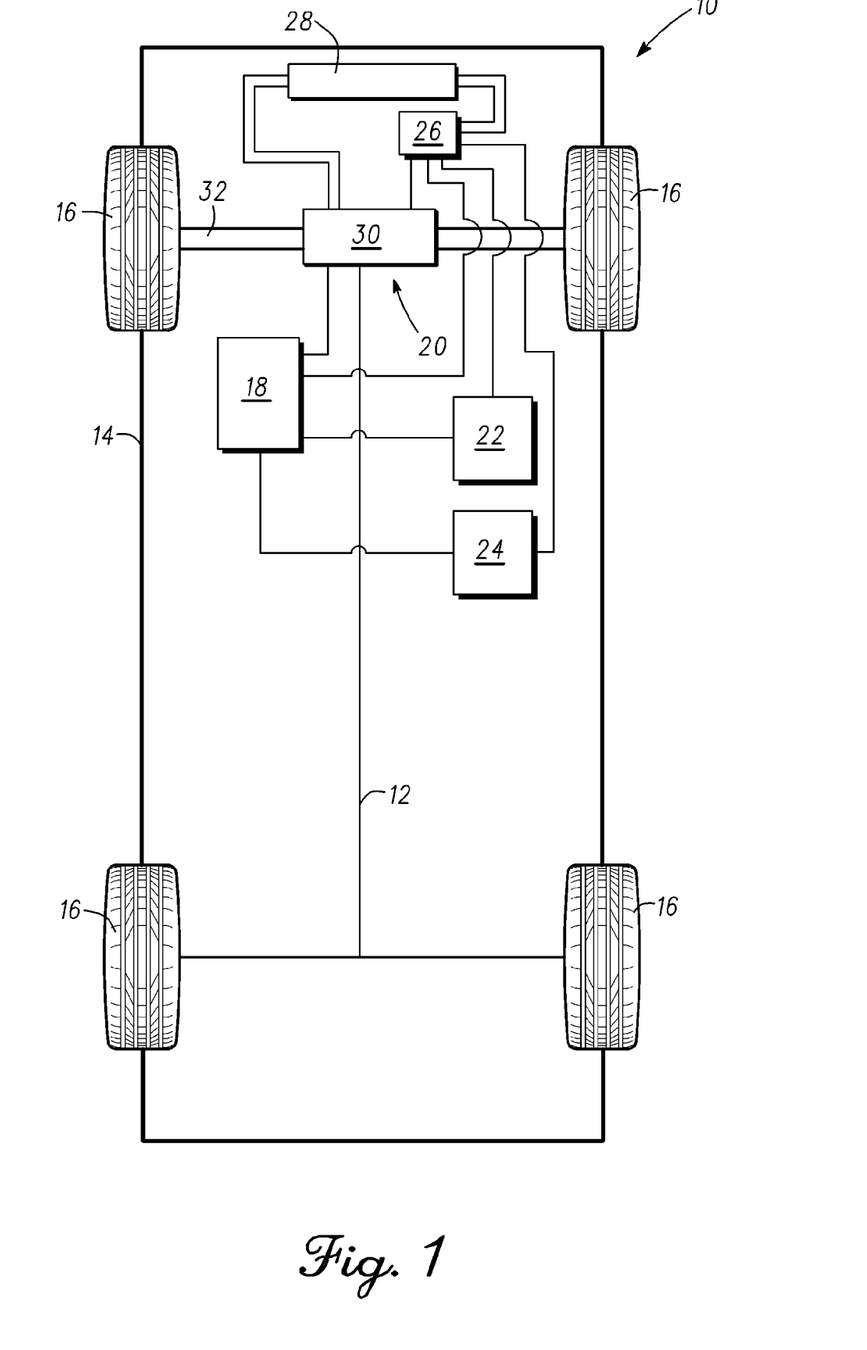
FIG. 1 is a schematic view of an exemplary automobile according to one embodiment of the present invention.

FIG. 1 illustrates a vehicle (or "automobile") 10, according to one embodiment of the present invention. The automobile 10 includes a chassis 12, a body 14, four wheels 16, and an electronic control system 18. The body 14 is arranged on the chassis 12 and substantially encloses the other components of the automobile 10. The body 14 and the chassis 12 may jointly form a frame. The wheels 16 are each rotationally coupled to the chassis 12 near a respective corner of the body 14.

The automobile 10 may be any one of a number of different types of automobiles, such as, for example, a sedan, a wagon, a truck, or a sport utility vehicle (SUV), and may be two-wheel drive (2WD) (i.e., rear-wheel drive or front-wheel drive), four-wheel drive (4WD), or all-wheel drive (AWD). The automobile 10 may also incorporate any one of, or combination of, a number of different types of engines, such as, for example, a gasoline or diesel fueled combustion engine, a "flex fuel vehicle" (FFV) engine (i.e., using a mixture of gasoline and alcohol), a gaseous compound (e.g., hydrogen and/or natural gas) fueled engine, a combustion/electric motor hybrid engine (i.e., such as in a hybrid electric vehicle (HEV)), and an electric motor.

In the exemplary embodiment illustrated in FIG. 1, the automobile 10 is a fuel cell vehicle, and further includes an actuator assembly 20, a fuel cell power module (FCPM) (or first voltage source or supply) 22, a battery (or a second voltage source or supply) 24, a power electronics assembly (e.g., a direct current-to-alternating current (DC/AC) inverter or inverter assembly) 26, and a radiator 28. It should be noted that, in at least one embodiment, the automobile 10 does not include a separate direct current-to-direct current (DC/DC) power converter.

Still referring to FIG. 1, the actuator assembly 20 includes an electric motor/generator (or motor) 30 that is integrated with a transmission such that it is mechanically coupled to at least some of the wheels 16 through one or more drive shafts 32.

As shown, the FCPM 22 and the battery 24 are in operable communication and/or electrically connected to the electronic control system 18 and the power electronics assembly 26. Although not illustrated, the FCPM 22, in one embodiment, includes among other components, a fuel cell having an anode, a cathode, an electrolyte, and a catalyst. As is commonly understood, the anode, or negative electrode, conducts electrons that are freed from, for example, hydrogen molecules so that they can be used in an external circuit. The cathode, or positive electrode, conducts the electrons back from the external circuit to the catalyst, where they can recombine with the hydrogen ions and oxygen to form water. The electrolyte, or proton exchange membrane, conducts only positively charged ions while blocking electrons, while the catalyst facilitates the reaction of oxygen and hydrogen. The battery 24 is, for example, a high voltage lithium ion battery, as is commonly understood.

The radiator 28 is connected to the frame at an outer portion thereof and although not illustrated in detail, includes multiple cooling channels therein that contain a cooling fluid (i.e., coolant) such as water and/or ethylene glycol (i.e., "antifreeze") and is coupled to the actuator assembly 20 and the power electronics assembly 26. In the depicted embodiment, the power electronics assembly 26 receives and shares coolant with the electric motor 30. However, other embodiments may use separate coolants for the power electronics assembly 26 and the electric motor 30. The radiator 28 may be similarly connected to the power electronics assembly 26 and/or the electric motor 30.

The electronic control system 18 is in operable communication with the actuator assembly 20, the FCPM 22, the battery 24, and the power electronics assembly 26. Although not shown in detail, the electronic control system 18 includes various sensors and automotive control modules, or electronic control units (ECUs), such as an inverter control module, a motor controller, and a vehicle controller, and at least one processor (or processing system) and/or a memory having instructions stored thereon (or in another computer-readable medium) for carrying out the processes and methods as described below.

Figure 2:
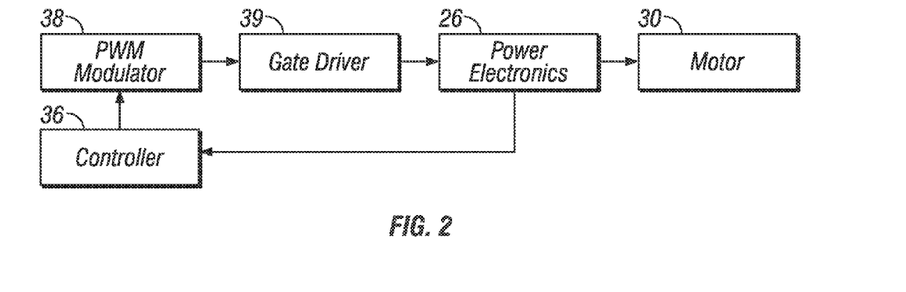
FIG. 2 is a block diagram of an inverter system within the automobile of FIG. 1.

Referring to FIG. 2, an inverter control system (or electric drive system) 34, in accordance with an exemplary embodiment of the present invention, is shown. The control system 34 includes a controller 36 in operable communication with a Pulse Width Modulation (PWM) unit (or a pulse width modulator) 38 and the power electronics assembly 26 (at an output thereof). The PWM modulator 38 is coupled to a gate driver 39, which in turn has an input coupled to an input of the power electronics assembly 26. The power electronics assembly 26 has a second output coupled to the motor 30. The controller 36 and the PWM modulator 38 may be integral with the electronic control system 18 shown in FIG. 1.

Figure 3:
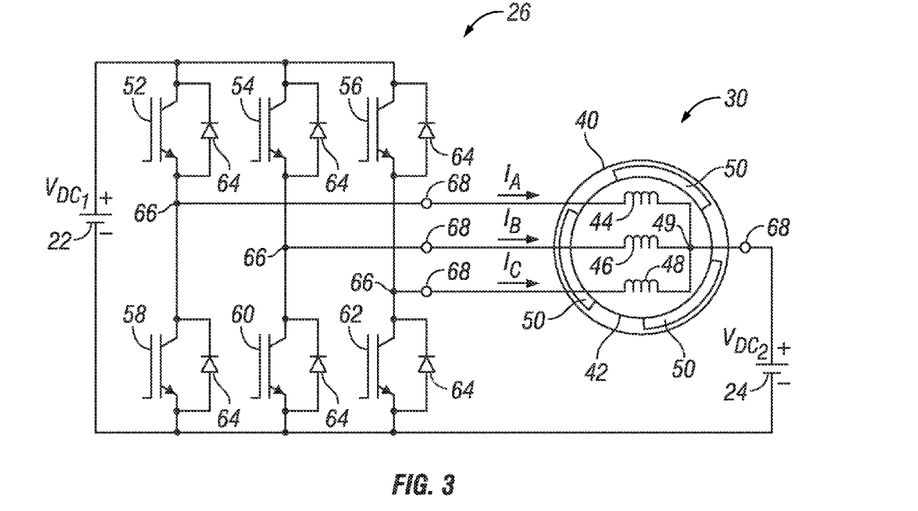
FIG. 3 is a schematic view of a power inverter, two voltage supplies, and an electric motor within the automobile of FIG. 1.

FIG. 3 schematically illustrates the FCPM 22, the power electronics assembly (or inverter) 26, and the motor 30 of FIGS. 1 and 2 in greater detail. The power electronics assembly 26 includes a three-phase circuit coupled to the motor 30. More specifically, the inverter 26 includes a switch network coupled to the FCPM 22 (i.e., a first voltage source ($V_{DC1}$)), the battery 24 (i.e., a second voltage source ($V_{DC2}$)) and the motor 30.

As will be appreciated by one skilled in the art, the electric motor 30, in one embodiment, is a permanent magnet electric motor (but other types of electric motors with a neutral connection may be used in other embodiments) and includes a stator assembly 40 (including conductive coils or windings) and a rotor assembly 42 (including a ferromagnetic core and/or magnets), as well as a transmission and a cooling fluid (not shown). In the depicted embodiment, the stator assembly 40 includes a plurality (e.g., three) conductive coils or windings 44, 46, and 48, each of which is associated with one of three phases of the electric motor 30, as is commonly understood, and a neutral node 49 that interconnects the windings 44, 46, and 48. The neutral node 49 may be exposed such that an electrical connection may be made through an exterior wall of the motor 30.

The rotor assembly 42 includes a plurality of magnets 50 and is rotatably coupled to the stator assembly 40, as is commonly understood. The magnets 50 may include multiple electromagnetic poles (e.g., sixteen poles). It should be understood that the description provided above is intended as example of one type of electric motor that may be used.

The switch network comprises three pairs (a, b, and c) of series power switching devices (or switches) 52-62 with antiparallel diodes 64 (i.e., antiparallel to each switch) corresponding to each of the phases of the motor 30. Each of the pairs of series switches comprises first and second switches, or transistors.

The first switch or first transistor in each pair (i.e., a "high" switch) 52, 54, and 56 has a first terminal (or drain) coupled to a positive electrode of the FCPM 22. The second switch or second transistor in each pair (i.e., a "low" switch) 58, 60, and 62 has a second terminal (or source) coupled to a negative electrode of the FCPM 22 and a first terminal coupled to a second terminal of the respective first transistor 52, 54, and 56 through a transistor node 66 such that the first and second transistors in each pair are connected in series.

Still referring to FIG. 3, the positive electrode of the battery 24 is connected to the neutral node 49 of the electric motor 30, and the negative electrode of the battery 24 is connected to the drain of the second switches 58, 60, and 62, as well as the negative electrode of the FCPM 22.

As is commonly understood, each of the switches 52-62 may be in the form of individual semiconductor devices such as insulated gate bipolar transistors (IGBTs) within integrated circuits formed on semiconductor (e.g. silicon) substrates (e.g., die). As shown, the diodes 64 are each connected in an antiparallel configuration (i.e., a "flyback" or "freewheeling" diode) to a respective one of the switches 52-62. As such, each of the switches 52-62 and the respective diode 64 may be understood to form a switch-diode pair or set, six of which are included in the embodiment shown.

Still referring to FIG. 3, the inverter 26 and/or the motor 30 also includes a plurality of current sensors 68, each of which is configured to detect the flow of current through a respective one of the windings 44, 46, and 48 of the motor 30 (and/or through the respective switches 52-62 or diodes 64) and the neutral node 49. In one embodiment, the current sensors 66 are Hall Effect sensors. Although each of the windings 44, 46, and 48 are shown as having an associated current sensor 68, it should be understood that in some embodiments, at least one of the windings 44, 46, and 48 or the neutral node 49 may not have such a current sensor.

During normal operation (i.e., driving), referring to FIG. 1, the automobile 10 is operated by providing power to the wheels 16 with the electric motor 30 which receives power from the FCPM 22 and the battery 24 in an alternating manner and/or with the FCPM 22 and the battery 24 simultaneously. In order to power the motor 30, DC power is provided from the FCPM 22 and the battery 24 to the power electronics assembly 26, which converts the DC power into AC power, as is commonly understood in the art. As is described below, if the motor 30 does not require the maximum power output of the FCPM 22, the extra power from the FCPM 22 may be used to charge the battery 24. If the motor 30 requires both the maximum power output of the FCPM 22, as well as power from the battery 24, power from the battery 24 may be used in combination with the FCPM 22 to operate the motor 30. As will be appreciated by one skilled in the art, the conversion of DC power to AC power is substantially performed by operating (i.e., repeatedly switching) the transistors within the inverter 26 at an operating (or switching) frequency, such as, for example, 12 kilohertz (kHz).

Referring to FIG. 2, generally, the controller 36 produces a Pulse Width Modulation (PWM) signal for controlling the switching action of the power electronics 26. The power electronics 26 then converts the PWM signal to a modulated voltage waveform for operating the motor 30. The inverter control system 34 of FIG. 2 provides multiple operations during normal, or forward, operation including, but not limited to, receiving a torque command, converting the torque command to current commands based on present speed and available voltage, and performing regulation on such current commands. The output of the current regulator (not shown) is the output voltage needed to produce the requested currents. The PWM unit 38 and the gate driver 39 generate the necessary gate pulses at a particular duty cycle, which are sent to the inverter 26 to control the electric motor 30 at the desired speed and/or torque. Additional considerations may be employed by the forward control path such as system temperatures, limitations, and additional communications or feedbacks to the overall system control in terms of operating status and availability.

According to one aspect of the present invention, the power electronics device 26 provides power to the electric motor 30 from the fuel cell 22 and the battery 24, while also managing the flow of power between the fuel cell 22 and the battery 24. Thus, in one embodiment, a single power electronics device (e.g., the inverter 26) functions as both a DC/AC inverter and a DC/DC converter. As will be described in greater detail below, in general, this is performed by operating the power switching devices within the inverter 26 in such a way that an AC waveform is generated that causes power to be delivered from the DC link to the electric motor 30. In order to manage the flow of power between the fuel cell 22 and the battery 24, the AC waveform is generated with a DC component (i.e., a relatively constant current offset). The value of this offset is based on the desired flow of current relative to (i.e., to or from) the battery 24.

Figure 4:
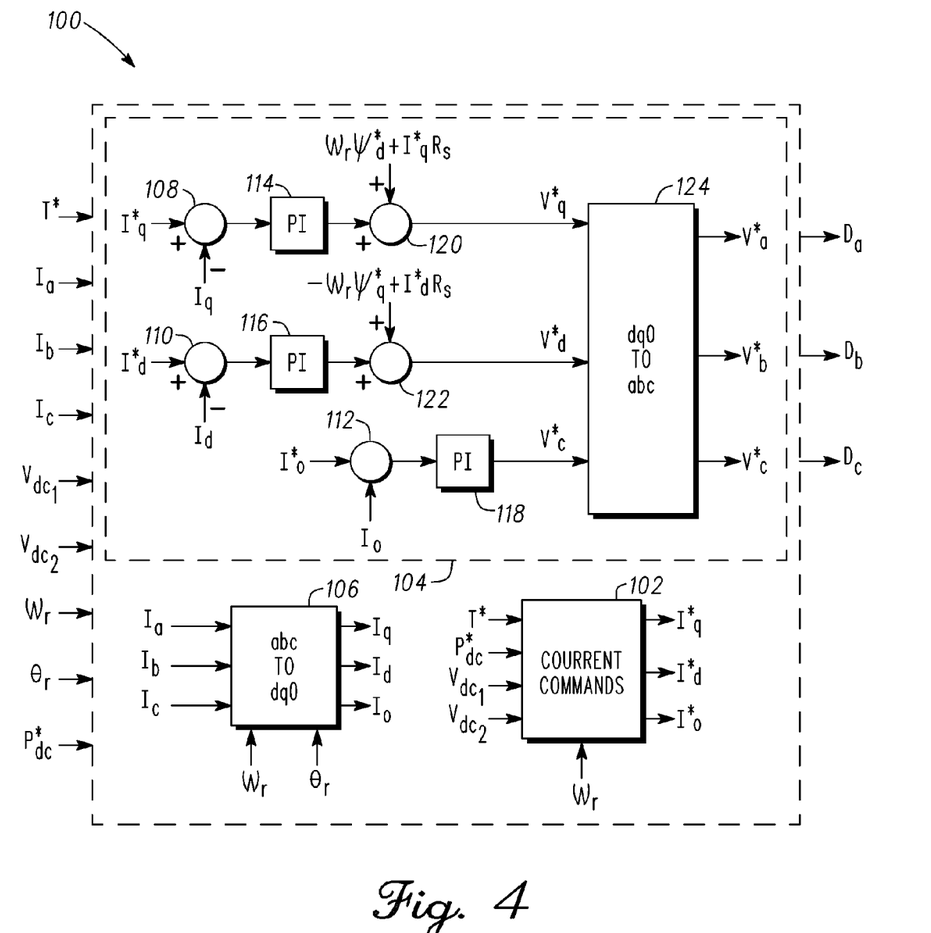
FIG. 4 is a combination block diagram and flow chart illustrating a system and/or method for controlling a motor according to one embodiment of the present invention.

FIG. 4 illustrates a motor (or torque) control system (and/or method) 100, according to one embodiment of the present invention. The system includes a current command block 102, current control loop 104, and a current monitor 106. As will be appreciated by one skilled in the art, in one embodiment, the control system 100 may be implemented within the electronic control system 18 (i.e., in the form of instructions stored on a computer-readable medium or "software"), particularly an inverter control module within the electronic control system 18. However, in other embodiments, portions of the control system 100 may be implemented as hardware, such as circuitry utilizing discrete electronic components.

As shown, the control system 100 receives as input (i.e., from various other subsystems and sensors in the automobile 10) a torque command (T*), winding currents ($I_a$, $I_b$, $I_c$) (as measured from three of the current sensors 68 described above), available voltages from the first and second voltage sources ($V_{dc1}$, $V_{dc2}$), the angular speed of the motor ($\omega_r$) (or of the rotor within the motor), the angular position of the motor ($\theta_r$), and a required (or desired) power flow between the first and second voltage sources ($P^*_{dc}$) (e.g., based on the voltages of the two voltage supplies and the torque command).

As shown, the torque command, the desired power flow, the available voltages of the two voltage sources 22 and 24, and the angular speed of the motor are sent to the current command block 102. The current command block 102 uses, for example, a look-up table stored on a computer-readable medium within the electronic control system 18 to generate commanded synchronous frame currents ($I^*_q$, $I^*_d$, $I^*_0$), as will be appreciated by one skilled in the art. The synchronous frame currents are then sent to the current control loop 104.

Within the current control loop 104, the synchronous frame currents ($I^*_q$, $I^*_d$, $I^*_0$) are received by respective summation circuits (or summers) 108, 110, and 112, each of which subtracts a sensed synchronous frame current ($I_q$, $I_d$, $I_0$) from the respective commanded current. The differences between the commanded and sensed synchronous frame currents (i.e., the errors) are sent to respective proportional-integral (PI) controllers 114, 116, and 118.

As will be appreciated by one skilled in the art, the PI controllers 114, 116, and 118 are feedback loop components that take a measured value (or output) from a process or other apparatus (e.g., summers 108, 110, and 112) and compare it with a set, or reference, value. The difference (or "error" signal) is then used to adjust an input to the process in order to bring the output to its desired reference value. The PI controllers 114, 116, and 118 may include a proportional and an integral term. The proportional term is used to account for the "immediate" or present error, which is multiplied by a constant. The integral term integrates the error over a period of time and multiplies the integrated sum by another constant.

As such, the PI controllers 114, 116, and 118 receive the present current error from summation circuits 108, 110, and 112 and generate signals that are representative of a combination of the present current error and the current error over a period of time. The output of the PI controllers 114 and 116 (associated with $I^*_q$ and $I^*_d$) are sent to summation circuits 120 and 122, respectively, which also receive, in one embodiment, decoupling voltage/feedforward terms ($\omega_r\psi^*_d + I^*_q R_s$, $-\omega_r\omega^*_q + I^*_d R_s$). The summation circuits 120 and 122 add the outputs of PI controllers 114 and 116 to the respective decoupling voltages and send the outputs, which are commanded synchronous frame voltages ($V^*_q$, $V^*_d$) to a synchronous-to-stationary reference frame (i.e., dq0 to abc) conversion block 124. As will be appreciated by one skilled in the art, the output of PI controller 118 is sent to conversion block 124 without being processed by a summation circuit. As is commonly understood, the reference frame conversion block 124 also receives the angular speed and position of the motor 30 and generates commanded stationary voltages ($V^*_a$, $V^*_b$, $V^*_c$), each of which corresponds to one of the three phases of the motor 30 or two of the phases and the neutral node 49.

Although not explicitly shown, the commanded stationary voltages are then converted into duty cycles ($D_a$, $D_b$, $D_c$) by, for example, the inverter control module within the electronic control system 18. The duty cycles are then used (e.g., by the PWM unit 38 and the gate driver 39, as described above) to operate the switches 52-62 within the inverter 26 to operate the motor 30.

Still referring to FIG. 4, the current monitor 106 includes a stationary-to-synchronous reference frame (i.e., abc to dq0) conversion block (also shown with reference numeral 106). The reference frame conversion block 106 receives sensed currents ($I_a$, $I_b$, $I_c$) from the current sensors 68, which correspond to the three winding currents or two of the winding currents and the current flow through the neutral node 49. The conversion block 106 also receives the angular speed and the angular position of the motor 30 and generates the sensed synchronous frame currents ($I_q$, $I_d$, $I_0$) used by the current control loop 104 as described above.

The duty cycles generated by the control system 100 (and/or the inverter control module) are used to operate the switches 52-62 such that the AC waveform generated includes a DC component (i.e., a non-zero average current or a zero sequence current) depending on the desired power flow ($P^*_{dc}$). In one embodiment, if the desired power flow involves power flowing to the second voltage source 24, the DC component is positive, and if the desired power flow involves power flowing from the second voltage source 24, the DC component is negative.

As will be appreciated by one skilled in the art, if the second voltage source 24 is a battery, it may be capable of receiving regenerative power from the first voltage source 22 and/or the motor 30 (i.e., the second voltage source 24) may be recharged. If the first voltage source 22 is a fuel cell, it may not be capable of being recharged. However, if the first voltage source 22 is also a battery (i.e., both voltage sources 22 and 24 are batteries), it may also be capable of being recharged. One skilled in the art will also appreciate that the DC component of the waveform (or the zero sequence current) may have no effect on the operation of the motor 30 and will substantially only result in the transfer of power between the first and second voltage sources 22 and 24.

Figure 5:
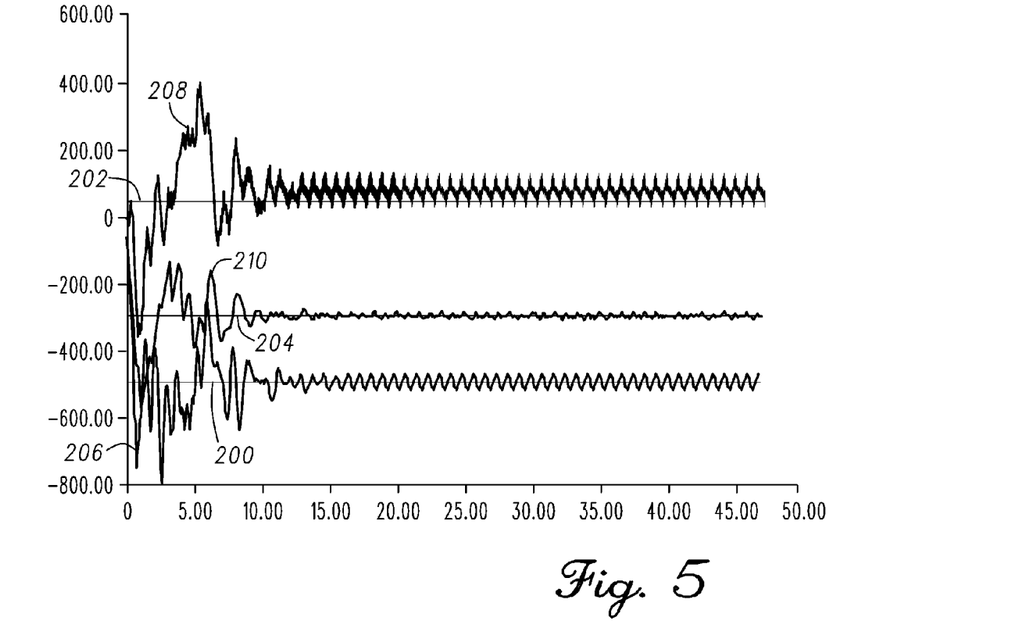
FIG. 5 is a graphical illustration of synchronous frame commanded currents and sensed currents associated with the operation of an electric motor according to one aspect of the present invention.
Figure 6:
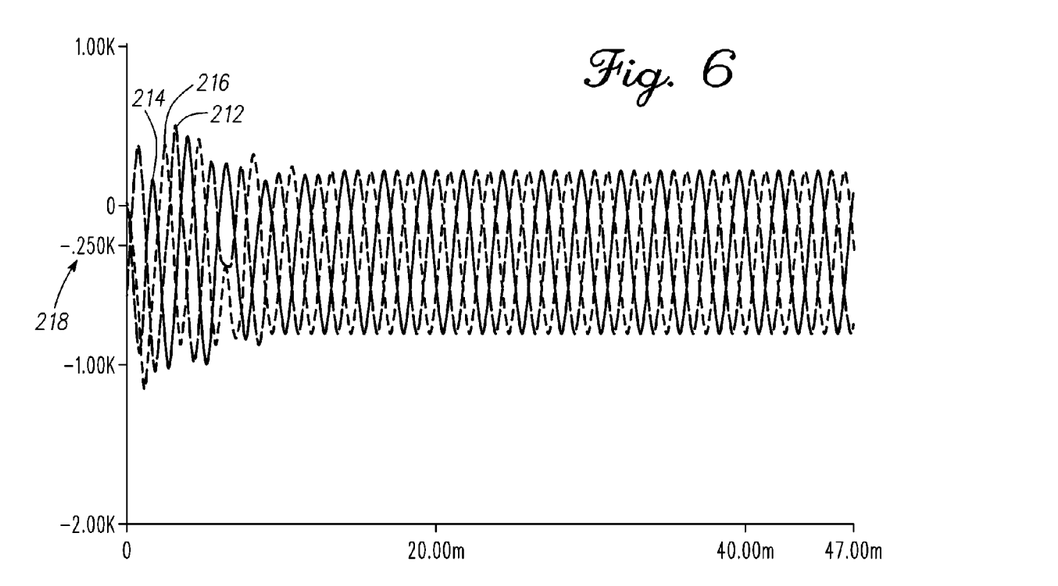
FIG. 6 is a graphical illustration of sensed winding currents for the operation of the motor of FIG. 5.

FIGS. 5 and 6 graphically illustrate various operational currents according to one embodiment of the present invention. On FIG. 5, three commanded synchronous frame currents are shown as reference numerals 200, 202, and 204, corresponding respectively to $I^*_q$, $I^*_d$, and $I^*_0$, and three resulting sensed currents 206, 208, and 210, corresponding respectively to $I_q$, $I_d$, and $I_0$. FIG. 6 shows three winding, or phase, currents 212, 214, and 216 (i.e., $I_a$, $I_b$, and $I_c$) which result from the operation represented in FIG. 5. As is apparent in both FIGS. 5 and 6, a negative DC component has superimposed over the currents, with a resulting DC component 218 of approximately −250 A. As described above, a negative DC component results in a power flow from, as opposed to, the second voltage source 24.

Because the single power electronics device (e.g., the power inverter) is able to provide power to the electric motor from the two voltages sources, as well as manage power flow between the two voltages sources, there is no need for an additional power electronics device, such as a DC/DC power converter. As a result, the propulsion system is simplified, as fewer components are needed, thereby decreasing costs, reducing weight, improving performance and reliability, and simplifying maintenance. Another advantage is that because the system in effect uses the windings of the electric motor as the "switching inductor," no additional inductor is needed, which even further reduces the number of parts as no additional cooling system is required to cool a switching inductor.

Other embodiments may utilize the method and system described above such as hybrid electric vehicles where the first voltage source is the output of generator powered by a heat engine. The output of the generator may be rectified from AC to DC using a power electronics device. In such an embodiment, the second voltage source may be a battery for accepting regeneration energy and supplementing power when required. The method and system described above may be implemented in systems other than automobiles, such as watercraft and aircraft. The electric motor and the power inverter may have different numbers of phases, such as two or four. Other forms of power sources may be used, such as current sources and loads including diode rectifiers, thyristor converters, inductors, capacitors, and/or any combination thereof.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. An automotive propulsion system comprising:
  a first voltage source;
  a power electronics device comprising a plurality of power switching devices coupled to the first voltage source;

an electric motor comprising a plurality of windings and a neutral node, the plurality of windings being coupled to the plurality of power switching devices and the neutral node interconnecting the plurality of windings, the electric motor including a plurality of current sensors that measure the flow of current through a respective one of the plurality of windings;

a second voltage source coupled to the neutral node of the electric motor and the first voltage source; and a processing system in operable communication with the first and second voltage sources, the power electronics device, and the electric motor, the processing system being configured to:

generate sensed synchronous frame currents based only on the flow of current measured by the plurality of current sensors, an angular position of the motor and an angular speed of the motor;

determine a desired power flow for the second voltage source;

generate commanded synchronous frame currents based on the desired power flow, an available voltage of the first voltage source and the second voltage source, the angular speed of the motor and a received torque command;

generate commanded stationary voltages for the electric motor based on the generated commanded synchronous frame currents and the sensed synchronous frame currents;

convert the commanded stationary voltages into duty cycles; and operate the plurality of power switching devices based on the duty cycles such that an alternating current (AC) waveform with a direct current (DC) component is generated based on the desired power flow, and the plurality of power switching devices generate a positive direct DC component when power flows to the second voltage source and generate a negative direct DC component when power flows from the second voltage source.

2. The automotive propulsion system of claim 1, wherein the power electronics device is a direct current-to-alternating current (DC/AC) power inverter comprising a plurality of pairs of transistors.

3. The automotive propulsion system of claim 2, wherein each of the plurality of pairs of transistors comprises a first transistor and a second transistor, the first transistor and the second transistor of each of the plurality of pairs of transistors being connected in series.

4. The automotive propulsion system of claim 3, wherein each first transistor and each second transistor comprises a source and a drain, and the first voltage source and the second voltage source each comprise a first terminal and a second terminal 5. The automotive propulsion system of claim 4, wherein the first terminal of the second voltage source is coupled to the neutral node of the electric motor.

6. The automotive propulsion system of claim 5, wherein the second terminal of the second voltage source is coupled to the drain of the second transistor in each of the plurality of pairs of transistors.

7. The automotive propulsion system of claim 6, wherein the drain of the first transistor and the source of the second transistor for each of the plurality of pairs of transistor are interconnected by a transistor node, and wherein each of the plurality of windings is coupled to the transistor node interconnecting the first and second transistors of a respective one of the plurality of pairs of transistors.

8. The automotive propulsion system of claim 7, wherein the first terminal of the first voltage source is coupled to the drain of the first transistor in each of the plurality of pairs of transistors.

9. The automotive propulsion system of claim 8, wherein the second terminal of the first voltage source is coupled to the drain of the second transistor in each of the plurality of pairs of transistors.

10. An automotive propulsion system comprising:

a fuel cell;

a power inverter comprising a plurality of power switching devices coupled to the fuel cell;

an electric motor comprising a plurality of windings and a neutral node, the plurality of windings being coupled to the plurality of power switching devices and the neutral node interconnecting the plurality of windings, the electric motor including a plurality of current sensors that measure the flow of current through a respective one of the plurality of windings;

a battery coupled to the neutral node of the electric motor and the fuel cell; and a processing system in operable communication with the fuel cell and the battery, the plurality of switching devices, and the electric motor, the processing system being configured to:

generate sensed synchronous frame currents based only on the flow of current measured by the plurality of current sensors, an angular position of the motor and an angular speed of the motor;

determine a desired power flow for the battery;

generate commanded synchronous frame currents based on the desired power flow, an available voltage of the fuel cell and the battery, the angular speed of the motor and a received torque command;

generate commanded stationary voltages for the electric motor based on the generated commanded synchronous frame currents and the sensed synchronous frame currents;

convert the commanded stationary voltages into duty cycles; and operate the plurality of power switching devices based on the duty cycles such that an alternating current (AC) waveform with a direct current (DC) component is generated based on the desired power flow, and the plurality of power switching devices generate a positive direct DC component when power flows to the battery and generate a negative direct DC component when power flows from the battery.

11. The automotive propulsion system of claim 10, wherein the plurality of power switching devices comprises a plurality of pairs of transistors, and each of the plurality of pairs of transistors comprises a first transistor and a second transistor, the first transistor and the second transistor of each of the plurality of pairs of transistors being connected in series.

12. The automotive propulsion system of claim 11, wherein each first transistor and each second transistor comprises a source and a drain, and wherein the fuel cell and the battery each comprise a first terminal and a second terminal.

13. The automotive propulsion system of claim 12, wherein the first terminal of the battery is coupled to the neutral node of the electric motor, the second terminal of the battery is coupled to the drain of the second transistor in each of the plurality of pairs of transistors, the drain of the first transistor and the source of the second transistor for each of the plurality of pairs of transistor are interconnected by a transistor node, each of the plurality of windings is coupled to the transistor node interconnecting the first and second transistors of a respective one of the plurality of pairs of transistors, and the first terminal of the fuel cell is coupled to the drain of the first transistor in each of the plurality of pairs of transistors, and the second terminal of the fuel cell is coupled to the drain of the second transistor in each of the plurality of pairs of transistors.

14. A method for operating automotive power electronics comprising a plurality of power switching devices couple to an electric motor comprising a plurality of windings interconnected by a neutral node and a plurality of current sensors that measure the flow of current through a respective one of the plurality of windings, a first voltage source, and a second voltage source coupled to the neutral node, the method comprising:
  generating sensed synchronous frame currents based only on a flow of current measured by the plurality of current sensors, an angular position of the motor and an angular speed of the motor;
  determining a desired power flow for the second voltage source;
  generating commanded synchronous frame currents based on the desired power flow, an available voltage of the first voltage source and the second voltage source, the angular speed of the motor and a received torque command;
  generating commanded stationary voltages for the electric motor based on the generated commanded synchronous frame currents and the sensed synchronous frame currents;
  converting the commanded stationary voltages into duty cycles; and
  operating the plurality of power switching devices based on the duty cycles such that an alternating current (AC) waveform with a direct current (DC) component is generated based on the desired power flow, the plurality of power switching devices generating a positive direct DC component when power flows to the second voltage source and generating a negative direct DC component when power flows from the second voltage source.

15. The method of claim 14, wherein the plurality of power switching devices comprises a plurality of pairs of transistors, and each of the plurality of pairs of transistors comprises a first transistor and a second transistor, the first transistor and the second transistor of each of the plurality of pairs of transistors being connected in series.

16. The method of claim 15, wherein each first transistor and each second transistor comprises a source and a drain, and wherein the first voltage source and the second voltage source each comprise a first terminal and a second terminal, and wherein the first terminal of the second voltage source is coupled to the neutral node of the electric motor, the second terminal of the second voltage source is coupled to the drain of the second transistor in each of the plurality of pairs of transistors, the drain of the first transistor and the source of the second transistor for each of the plurality of pairs of transistor are interconnected by a transistor node, each of the plurality of windings is coupled to the transistor node interconnecting the first and second transistors of a respective one of the plurality of pairs of transistors, and the first terminal of the first voltage source is coupled to the drain of the first transistor in each of the plurality of pairs of transistors, and the second terminal of the first voltage source is coupled to the drain of the second transistor in each of the plurality of pairs of transistors.

17. The method of claim 16, wherein the first voltage source is a fuel cell and the second voltage source is a battery.

* * * * *